United States Patent [19]

Dinwiddie

[11] 4,065,969

[45] Jan. 3, 1978

[54] LOW IMPEDANCE, HIGH CURRENT PRESSURE TRANSDUCER

[76] Inventor: Kendall L. Dinwiddie, 543 Jackson Drive, Palo Alto, Calif. 94303

[21] Appl. No.: 682,999

[22] Filed: May 4, 1976

[51] Int. Cl.² .............................................. G01L 9/06
[52] U.S. Cl. ........................................ 73/727; 338/4; 73/730
[58] Field of Search .............. 73/398 AR, 406, 119 A, 73/194 E; 338/4, 42

[56] References Cited

U.S. PATENT DOCUMENTS

| 3,242,449 | 3/1966 | Stedman | 338/4 |
| 3,937,087 | 2/1976 | Heggie | 73/398 AR |

*Primary Examiner*—Donald O. Woodiel
*Attorney, Agent, or Firm*—Michael L. Harrison

[57] ABSTRACT

An apparatus is provided for determining the internal pressure of a fluid conduit in line with which the apparatus is inserted. Fluids transported through the conduit are caused to pass through a thin-walled inner tubular member which expands and contracts in response to increases and decreases in fluid pressure. Surrounding the thin-walled conduit is a layer of piezo-conductive material which is in turn surrounded by a snugly fitting, relatively inelastic outer tube. Pressure inside the thin-walled inner conduit causes the piezo-conductive material to be compressed between the thin-walled conduit and the outer inelastic tube thereby producing a change in the conductance of the piezo-conductive material. A conductance analog of pressure is thereby produced between electrodes attached to the thin-walled inner conduit and the inelastic outer tube. The device may be rendered in very high current, low conductance forms for use in direct modulation of high current circuits.

9 Claims, 5 Drawing Figures

LOW IMPEDANCE, HIGH CURRENT PRESSURE TRANSDUCER

BACKGROUND OF THE INVENTION

1. Field of the Invention

The present invention relates to measuring devices and, more particularly, to transducers for sensing fluid pressure in a tubular conduit.

2. The Prior Art

In the past a variety of pressure transducers have been proposed which employ a number of different principles. In one class of devices, represented by, e.g., Ostergren U.S. Pat. Nos. 2,420,148 and Kooiman 3,079,576, strain gages are applied directly to the surface of a fluid-transporting conduit. Changes in pressure within the conduit cause a slight expansion or contraction in the diameter of the pipe, thus causing the strain gage to register a change in resistance.

A second class of devices, represented, e.g., by Alibert et al. U.S. Pat. Nos. 3,603,152 and Vasek 3,698,248, employ piezo-electric elements held in contact with a conduit by a fixture which may be removable. Changes in pressure within the conduit are represented by slight voltage variations produced by the piezo-electric element when it is stressed by the expansion of the conduit.

In a third class of devices, the expansion or contraction of the pipe is multiplied by a mechanical multiplier to increase the pressure applied to the sensing element. This class of devices is represented by, e.g., Weaver U.S. Pat. No. 3,698,249.

All of the above devices suffer from a common drawback: their output signals are weak and require considerable voltage and power amplification before they may be put to useful work. For the second and third categories of devices, the cost of fixtures must be counted as a drawback since much expensive machine work is required to produce them.

Since many applications for pressure transducers contemplate that eventually the output of the transducer will be used to produce useful work, it is required for those applications that a sufficiently high power output be available. When amplification is required to fulfill this requirement, the cost of using the succeeding amplifer stages must be added to the cost of the transducer.

The present invention is intended to remedy these drawbacks by providing a new and useful pressure transducer having a current output large enough in magnitude to directly operate lamps, control valves, solenoid relays and the like without need for intervening electronic amplification.

OBJECTS OF THE INVENTION

Accordingly, it is an object of the invention to provide a new and improved pressure transducer for sensing fluid pressure in a conduit by insertion of the transducer in series with the conduit.

It is another object of the present invention to provide a pressure transducer having a very low electrical impedance.

It is still another object of the present invention to provide a fluid pressure transducer which is rugged.

It is yet still another object of the present invention to provide a pressure transducer which is simple in structure and economical to manufacture.

It is yet still another object of the present invention to provide a new pressure transducing device capable of doing useful work without requiring electronic amplification of its output signals.

It is a further object of the present invention to provide a new pressure transducer capable of modulating high currents.

Briefly, the present invention accomplishes these and other objects by providing a conductive thin-walled inner conduit having an exterior which is coated with a piezo-conductive material. The thin-walled inner conduit is snugly fitted into a relatively inelastic, conductive, outer tube. Expansion of the inner conduit under the influence of fluid pressure compresses the piezo-conductive material between the inner conduit and the outer tube causing an increase in the conductance of the piezo-conductive material, thereby producing a conductance analog of pressure between the conductive inner conduit and the conductive outer tube.

BRIEF DESCRIPTION OF THE DRAWINGS

The features of the invention which are believed to be novel are distinctly claimed and particularly pointed out in the concluding portion of this specification. However, the invention, both as to its organization and operation, together with further objects and advantages thereof may best be appreciated by reference to the following detailed description taken in conjunction with the drawings, wherein:

DESCRIPTION OF THE PREFERRED EMBODIMENT

Figure 1:
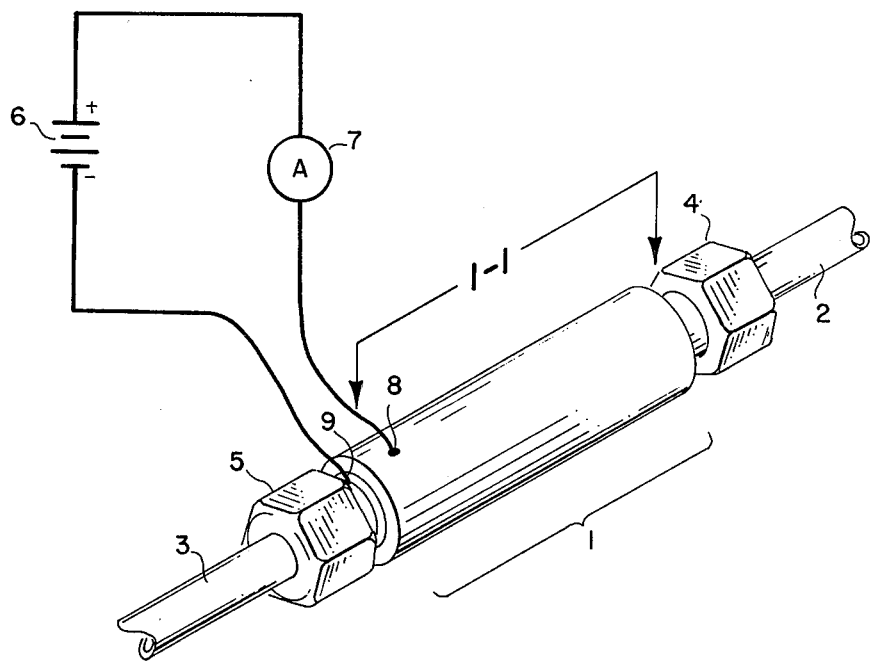
FIG. 1 is a pictorial view of a pressure transducer embodying the present invention, showing its relationship to a fluid conduit and an electrical schematic of a possible electrical circuit in which the transducer acts as a modulator for an electrical current.

Referring now to FIG. 1, there is shown a pictorial view of the present invention 1 along with a simplified electrical circuit showing a source of electrical current 6, for detecting the current flow within the circuit 7, and the connection of the circuit to the pressure transducer. The main body of the transducer 1 is connected to an inlet line 2 and an outlet line 3 by compression fittings 4 and 5 for inlet and outlet respectively.

Fluids flowing in the conduit pass through the inlet line 2, into and through the transducer body 1, and out the outlet line 3. Pressure changes within the conduit produce a resistance change between the electrical connections 8 and 9 to the transducer, thereby causing a current change in the electrical circuit depicted, as is more particularly described below.

Figure 3:
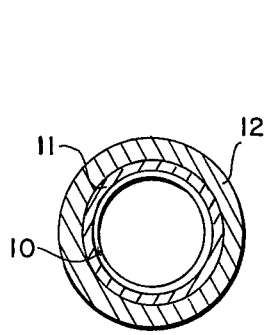
FIG. 3 is a cross-sectional view seen in the plane of lines 2—2 of FIG. 1.
Figure 2:
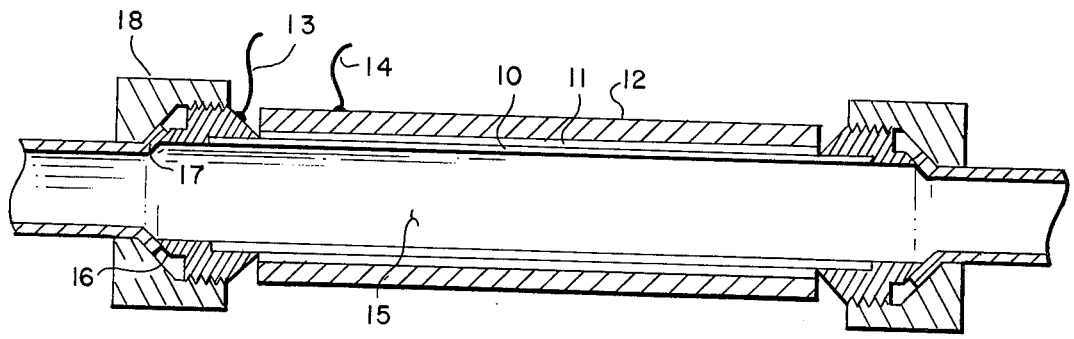
FIG. 2 is a cross-sectional view seen in the plane of lines 1—1 of FIG. 1.

Referring now to FIGS. 2 and 3, there are shown in the figures a cross-sectional view through section lines 1—1 of FIG. 1 and a cross-sectional end view through section lines 2—2 of FIG. 2 showing the internal construction of the pressure transducer. In FIG. 2 is shown the thin-walled conduit 10 having an interior surface and an exterior surface and having releasable compression fittings 18 and 19 on each end, which are visible only in FIG. 2. The thin-walled conduit is coated with a piezo-conductive material 11 having properties adapted to this particular application as will be described below.

The coating is preferably applied to the thin-walled conduit with a uniform thickness.

A thick-walled tube having an interior and exterior surface 12 is snugly fit over the thin-walled conduit and its piezo-conductive coating.

Electrical connection to the thin-walled conduit is accomplished through lead wire 13, and electrical connection to the thick-walled conduit is applied through lead 14.

On either end of the thin-walled conduit a compression fitting is located. On the inlet side, for example, compression fitting 15 has a beveled surface 16 which may be a part of the hydraulic line in which the pressure transducer is inserted. A threaded compression nut 18 urges the flared female fitting 17 onto the mating surface 16 of the compression fitting 15.

It will be appreciated that any fluid-tight coupling mechanism may be employed and that compression fittings as described herein are used for illustration only, and in no way limit the claims of the present inventions.

The thin-walled conduit 10 is adapted to expand diametrically under the pressure created by the fluid within the conduit. The thick-walled tubing 12 is designed to have minimal diametrical expansion, so that when compared to the coefficient of expansion under pressure for the thin-walled conduit, the thick-walled conduit may be said to be, for all practical purposes, inelastic. Under the influence of fluid pressure from the interior, the thin-walled conduit expands outward against the restraint provided by the thick-walled tubing 12. In the course of its expansion, the piezo-conductive coating 11 is compressed between the outer surface of the thin-walled conduit and the inner surface of the thick-walled conduit 12. The compression of the piezo-conductive material causes a proportional increase in the conductivity of the piezo-conductive coating. If a current source is applied to lead 13 and returned through lead 14, the variation in conductivity between the two leads will be registered as a variation in current flow through the inter-connecting wires. Thus, a current analog of pressure is produced in the electrical circuit depicted.

Referring still to FIGS. 2 and 3, the inner conduit 10 and the outer tube 12 are depicted as having a circular cross-section. This geometry is preferred for several reasons. In general, circular shapes are easily obtained on conventional machine tools without great expense. Many extruded forms are also circular. Furthermore, the conduits in which the device is intended to be inserted are generally of circular cross-section. Thus, a circular cross-section produces the best match of internal surfaces resulting in minimization of disturbance to the fluid flow and minimum pressure drop through the device itself. Both fluid flow rates and transducer accuracy are enhanced by minimizing the discontinuity which is produced by insertion of the device into a conduit.

Finally, a circular cross-section is preferred in order to obtain the most predictable coefficient of expansion with internal pressure for the inner conduit. Irregularly shaped, and particularly sharply bent, conduits produce non-uniform expansion coefficients around their circumferences and result in portions of the device having high sensivity to pressure changes and other portions having low sensitivity. The overall sensitivity is therefore difficult to predict and to control during manufacture. Nonetheless, cross-sections of arbitrary shape may be employed without departure being made from the teaching of the present invention and its claims.

Figure 4:
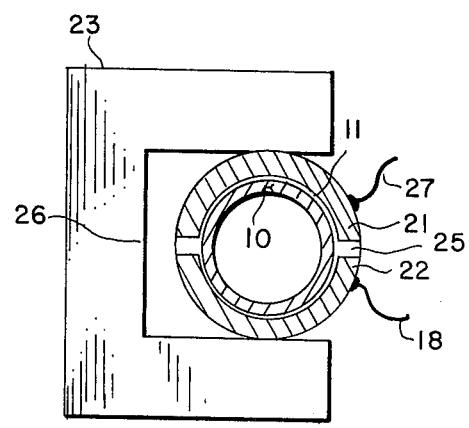
FIG. 4 is a cross-sectional end view of a variant of the preferred embodiment intended for specialized application.

Referring now to FIG. 4., there is shown a variation of the preferred embodiment, one of many possible which may be practiced within the scope of the claims of the present invention. FIG. 4 employs a thin-walled conduit 10 similar to that employed in the previous description of the preferred embodiment. However, as will become apparent from the following discussion, it is not required in the configuration of FIG. 4 that the inner tubing be electrically conductive.

A coating of piezo-conductive material 11 is applied to the thin-walled conduit of FIG. 4 in the same manner and in the same relationship as that of FIGS. 1, 2 and 3. Instead, however, of a single-piece outer tubing, the outer tubing in FIG. 4 is comprised of two half-circular tubings 21 and 22 each of which extend slightly less than 180° around the outer circumference of the thin-walled conduit 10 and its coating 11. The two half-tubings 21 and 22 are prevented from making contact by electrically insulating spacers, 25 and 26. A restraining member 23 maintains the inner walls of the outer tubings 21 and 22 in a constant fixed relationship. The restraining member 23 is shown as a "C"-clamp for clarity, but it will be appreciated that any means of restraining the movement of half-circular tubing 21 and 22 away from the axis of the conduit will suffice.

Pressure build-up within the inner thin-walled conduit creates a diametrical expansion of the thin-walled conduit 10, which in turn compresses the piezo-conductive material 11 between the outer wall of the thin-walled conduit and the inner walls of the half-tubings 21 and 22. As the piezo-conductive material is compressed its electrical conductivity is increased and may be measured by means of lead wires 27 and 28. If a current source is applied to 27 and returned through 28 the current will be seen to increase with increase in the pressure applied to the interior of the thin-walled conduit, thereby again producing a current analog of pressure.

The arrangement of FIG. 4 will be useful in those applications in which it is undesirable to have an electrically conductive material for the thin-walled conduit. This may be the case, for example, where it is desired to have a non-metallic conduit because of the chemical properties of the fluid being transported through the transducer, i.e., in cases in which the presence of a metal conduit would produce an undesirable chemical reaction with the fluid in its interior.

Figure 5:
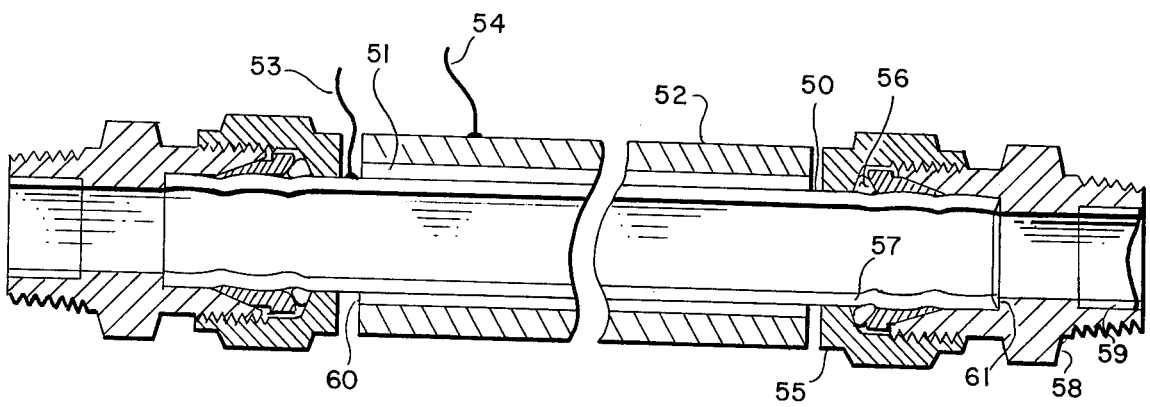
FIG. 5 is a cross-sectional view of a second variant of the preferred embodiment which employs a polymeric inner conduit.

Referring now to FIG. 5, there is shown a second variant of the preferred embodiment.

The inner conduit 50 is made of a non-conductive tubing such as polymeric tubing, as in the device of FIG. 4. Wrapped around the outer surface of the tubing is a layer of conductive foil 60 which conforms closely to the surface of the conduit. A layer of piezo-conductive material 51 is applied over the layer of foil 60 and the entire assembly is surrounded by a conductive inelastic outer tube 52.

Electrical connection to the foil is made to a tab of the foil by conductor 53. Electrical connection to the outer inelastic tube is made by conductor 54.

The polymeric tubing is relatively easily expanded by internal pressure, a property which can be easily controlled by controlling wall thickness. Since small pressure changes can be made to cause expansion of the conduit, a sensitive pressure indicator may be obtained.

Connection of the transducer into a fluid conduit may be achieved by a variety of coupling designs which are intended for use in coupling non-metallic conduits. The device depicted in FIG. 5 is a Hoke GYROLOK which employs a rear ferrule 56 which engages both a front ferrule 57 and the conduit 50 wedging the front ferrule 56 and rear ferrule 57 into the conduit wall producing a locking grip on the conduit. Nut 55 tightens on the threaded body 58 causing the ferrules to tighten and urging the conduit into engagement with the mating surface 61 of the body 58.

In addition to the GYROLOK depicted, the Imperial Eastman NYLO-SEAL and similar fittings may be used.

The device of FIG. 5 will be preferred in those cases where a high sensitivity is desired in a transucer employing a non-metallic conduit.

While need for transducers having a low electrical output impedance is common, the prior art transducers have generally been unable to meet this need without resort being made to electronic buffering of their usually weak, high impedance outputs.

It is a common mistake to judge the cost of a prior art transducer by its unit cost alone, but to be realistic, one must include also the cost of actually using the transducer in a practical application. In the case of transducers which are used to produce signals which ultimately perform useful work, this cost may exceed the transducer cost by large multiples. To the basic cost of the transducer must be added the cost of electronic voltage pre-amplification and power amplification, plus the cost of power supplies, heat dissipation equipment and related hardware.

The present invention, in addition to being an inexpensive item in terms of unit costs, avoids expense associated with the need for ancillary electronic equipment by providing high output current capability which may be used directly to operate power-consuming devices. For most applications, no additional power amplification is required but for those in which additional current is required, a cost advantage over the prior art may still be realized since elimination of some, or all, intermediate level amplification is possible.

The ability of the present device to provide high current outputs depends upon two factors: (1) the devices's low inherent impedances, (2) the device's ability to dissipate relatively high power.

The impedance desirable for a particular transducer will, of course, depend upon its particular application. Due to the cross-sectional uniformity of the device, the characteristic impedance can be easily tailored by simply adjusting the length of the thin-walled conduit and the outer tubing while maintaining the same cross-section. A direct proportion exists. For example, if a particular conduit cross-section and coating thickness produces a 10-ohm (quiescent value) transducer which is 1-inch in length, then without varying the thickness of the coating or its bulk electrical properties, it is possible to make a 1-ohm (quiescent value) transducer by simply making a 10-inch long version of the same transducer. In practice, a more desirable mechanical configuration would probably be achieved, for the example given, by decreasing the thickness of the piezo-conductive material or by increasing the diameter of the transducer, within the constraints provided by the geometry of the conduit itself. But for less extreme variations the principle described may be applied exactly.

When the present invention is employed as a high-current modulator, the ability to dissipate power becomes a factor. The construction of the device enhances this ability as does its intended use in a fluid-transporting conduit.

The thermal paths for carrying heat away from the device via the conduit itself are ample, provided, of course, that the conduit is made of thermally conductive material. The exterior surface area of the conduit extended over the length of the conduit may be quite large and may be caused to be in intimate thermal contact with the device. In addition to the conduit itself, however, the fluid being contained within the conduit may also be relied upon for conduction of heat away from the device, so that for most applications the devices will be self-cooling. Limitations on the use of the fluid as a coolant will, of course, be encountered in those applications in which it is undesirable to raise the temperature of the fluid.

As described above, the ability of the present invention to handle large current flows and large amounts of power distinguishs its performance in this regard from the devices of the prior art and renders power amplification unnecessary for many applications.

Piezo-conductive materials suitable for the coating 11 may be of several types. The simplest and most readily available is the colloidal suspension of graphite in water known as Aquadag. While, in principle, the Aquadag coating is adequate, practical difficulties in applying the material uniformly and avoiding rupture at anomalies on the surfaces of the inner and outer conductive inelastic tubes make Aquadag a poor choice. A preferable material is a piezo-conductive rubber manufactured by DuPont under the name PITEL PR. This material has a bulk resistance variation of approximately 1000 to 1 from its normal state to a fully compressed state.

The properties of PITEL remain within acceptable limits over a wide range of temperatures making it an excellent choice for pressure transducers used in adverse environments.

It will be appreciated from the generally rugged mechanical construction of the present invention, that its immunity to damage from mechanical shock and vibration will be much greater than that of the prior art. For example, the delicate wiring employed in strain gauges is obviated by use of a large and securely fastened piezo-conductive coating as a means for producing variations in conductivity. Similarly, the piezo-conductive element which can be applied in arbitrary shapes to fit to a rugged mechanical structure obviates the need for fragile crystalline material of relatively unchangeable shape such as the familiar Rochelle salts, common in the prior art.

Due to the simple geometry of the present invention and the absence of any cantilevered masses the present invention is also relatively immune to the effects of mechanical shock and vibration-induced spurious signals. This problem has previously plagued the art of pressure measurement. In fact, it is the major need addressed by the pressure transducer invention of Vasek U.S. Pat. No. 3,698,248.

While a preferred embodiment of the present invention has been described, it should be understood that various changes, adaptions, and modifications may be made therein without departing from the spirit of the invention or the scope of the following claims.

What is claimed is:

1. A device for producing a response proportional to pressure within a fluid-transporting conduit comprising:
   a conductive inner tubular member having an inlet and an outlet adapted at the inlet and outlet to connect to the fluid transporting conduit;
   a coating of piezo-conductive material applied to the exterior surface of the inner tubular member; and
   a conductive outer tubular member closely fitting and contacting the coating of piezo-conductive material.

2. The device of claim 1 wherein the piezo-conductive coating is Aquadag.

3. The device of claim 1 wherein the piezo-conductive coating is PITEL PR.

4. The device of claim 1 wherein the inner and outer tubular members are uniform and regular in cross-section.

5. The device of claim 4 wherein the inner and outer tubular members are circular in cross-section.

6. The device of claim 1 wherein the inner tubular member is thin-walled.

7. The device of claim 6 wherein the inner tubular member is relatively elastic and the outer tubular member is relatively inelastic.

8. A device for producing a response proportional to pressure within a fluid transporting conduit, comprising:
   an inner tubular member having an inlet and an outlet adapted at the inlet and outlet to connect to the fluid-transporting conduit;
   a coating of piezo-conductive material applied to the exterior surface of the inner tubular member;
   two electrically conductive members held in contact with the coating of piezo-conductive material;
   restraining means for holding the two electrically conductive members in contact with the inner tubular member such that expansion of the inner tubular member will cause the piezo-conductive material to be compressed between the exterior wall of the inner tubular member and the electrically conductive members.

9. The device of claim 8 wherein the inner tubular member is non-conductive.

* * * * *